US007009836B2

(12) United States Patent
Lo

(10) Patent No.: US 7,009,836 B2
(45) Date of Patent: Mar. 7, 2006

(54) LOCKING DEVICE

(75) Inventor: Chao-Yuan Lo, Tu Chen (TW)

(73) Assignee: Quanta Computer, Inc., Tao Yuan Shien (TW)

( * ) Notice: Subject to any disclaimer, the term of this patent is extended or adjusted under 35 U.S.C. 154(b) by 34 days.

(21) Appl. No.: 10/874,233

(22) Filed: Jun. 24, 2004

(65) Prior Publication Data

US 2005/0041383 A1    Feb. 24, 2005

(30) Foreign Application Priority Data

Aug. 20, 2003   (TW) .............................. 92122927 A

(51) Int. Cl.
 *G06F 1/16* (2006.01)
(52) U.S. Cl. ........................... 361/683; 70/57; 248/552
(58) Field of Classification Search ................. 361/683
See application file for complete search history.

(56) References Cited

U.S. PATENT DOCUMENTS 6,115,244 A * 9/2000 Chen et al. .................. 361/686
6,256,194 B1 * 7/2001 Choi et al. ................... 361/683
6,297,951 B1 * 10/2001 Lee ............................. 361/685
6,469,900 B1 * 10/2002 Cheng ......................... 361/726
6,654,239 B1 * 11/2003 Smith ......................... 361/683
6,678,154 B1 * 1/2004 DeLuga ...................... 361/683
6,785,141 B1 * 8/2004 Fang .......................... 361/727

* cited by examiner

*Primary Examiner*—Lisa Lea-Edmonds
(74) *Attorney, Agent, or Firm*—Rabin & Berdo, PC

(57) ABSTRACT

A locking device is described. The locking device is utilized to lock and unlock a removable device and especially to be suitable for locking and unlocking the removable device of a notebook computer. The locking device has a latch, an elastic member and a sliding switch. The latch engages a fixing indention of the removable device to fix the removable device. The elastic member provides a force to push the latch forward and a recess for retracting the latch backward. The sliding switch utilizes a stud to glidingly couple to a sliding surface of the latch so that the movements of the sliding switch and the latch form a predetermined included angle, preferably of about 90 degrees.

20 Claims, 3 Drawing Sheets

LOCKING DEVICE

FIELD OF THE INVENTION

The present invention relates to a locking device, and more particularly, to a locking device for locking a peripheral device in a notebook computer.

BACKGROUND OF THE INVENTION

Information technology and the computer industry are highly developed now. Portable electronic devices, such as notebook computers, are widely used. Due to weight and practicality requirements, portable devices tend to be lighter, thinner and smaller. The notebook computer is a successful product because, in spite of its small size, it is capable of doing powerful calculations with a great deal of digital data.

A computer operates centrally via a motherboard, and during operation, besides using a central processing unit (CPU) for calculations, peripheral devices are employed to provide greater functionality, devices such as a floppy disk (FD) drive, a hard disk drive (HDD), a compact disc read-only memory (CD-ROM) drive, a rewritable CD (CD-RW) drive, a digital video disc (DVD) drive and a card reader.

Currently, notebook computers are popular in the market because their key components have become gradually less expensive, and therefore, notebook computers have become more and more affordable to the user. Notebook computer usage is rivaling that of desktop computers. Furthermore, the functionality and performance of notebook computers are coming near those of desktop computers. Due to requirements for office mobility and the electronic-enterprise trend caused by the popular use of the Internet all over the world, notebook computer usage is getting more popular.

Different users of notebook computers need different peripheral devices for their business activities. However, a common problem of the notebook computer is that the internal space is too small to install all desired peripheral devices therein. Hence, a removable device module for a notebook computer has been developed to enable external peripheral devices to be easily swapped in and out of the notebook computer. The removable device module, then, effectively enhances the performance and functionality of the notebook computer.

A conventional notebook computer with a removable device module utilizes a locking device to lock the removable device within the notebook computer for safe operation. When a user needs to withdraw or exchange the removable device, the locking device is manipulated to release the removable device from the removable device module. A latch of the locking device is usually disengaged from an indentation on the removable device that is perpendicular to the withdrawal direction of the removable device. In the perpendicular direction, the locking device and the latch have to be employed over a large length to lock effectively and release the removable device safely. However, the internal space of a notebook computer gets tighter every day. Thus, so the traditional locking device with the large length in the perpendicular direction may interfere with other devices. Therefore, there is a need to lock and release the removable device for the notebook computer with limited space safely.

SUMMARY OF THE INVENTION

One objective of the present invention is to provide a locking device that occupies less volume than traditional locking devices.

Another objective of the present invention is to provide a locking device that effectively fixes a removable device within a removable device module.

A further objective of the present invention is to provide a locking device with a sliding switch that moves parallel to the withdrawal direction of the removable device in order to reduce a required length in the direction perpendicular to the withdrawal direction and provide an effective and safe fixing method for the removable device.

The present invention provides a locking device suitable to fix or remove a removable device, and especially to fix or remove the removable device for a notebook computer. The locking device has a latch with a sliding inclined surface, an elastic member and a sliding switch.

The latch engages into a fixing indentation of the removable device to fix the removable device within a fixing container. The elastic member forces the latch forward to engage into the fixing indentation. The latch can be forced backward, compressing the elastic member, by a shell of the removable device such that installation or removal of the removable device is not interfered with.

The sliding switch glidingly couples to the latch, and the movements of the latch and the sliding switch form a predetermined included angle, preferably of about 90 degrees. The sliding switch further has a stud that couples to the sliding inclined surface. When the sliding switch is pushed to release the removable device, the stud can press on the sliding inclined surface to withdraw the latch from the fixing indentation of the removable device.

The locking device further has a sliding holder with a first sliding guider and a second sliding guider. The latch couples to the first sliding guider and the sliding switch couples to the second sliding guider.

Another aspect of the present invention provides a removable device module with a locking device. The removable device module with the foregoing locking device is configured beside the fixing container of the removable device module so as to safely fix and easily remove the removable device.

A further aspect of the present invention provides a notebook computer having a removable device module with a locking device. The notebook computer utilizes the foregoing locking device to safely fix a peripheral device, e.g. a floppy disk drive, a hard disk drive, a card reader or an optical disk drive, therein and conveniently remove the peripheral device from the notebook computer. Due to the movements of the latch and the sliding switch forming an included angle, the included angle, especially when the angle is about 90 degrees, can effect the absorption and dissipation of inertial forces of the latch and the sliding switch caused by an impact force acting on the notebook computer. Accordingly, the notebook computer is effectively protected from losing the peripheral device even under the impact force.

The locking device can effectively lock an electrical apparatus in the fixing container and provide a capability for quickly exchanging electrical apparatuses. The locking device according to the present invention can also effectively reduce the protrusion length of the removable device module so as to reduce the space occupied by the locking device. Hence, the locking device can provide a quick fixing and removal mechanism for a removable device in a notebook computer. Furthermore, the locking device can effectively reduce the space occupied within the notebook computer and thereby avoid interfering with other devices.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
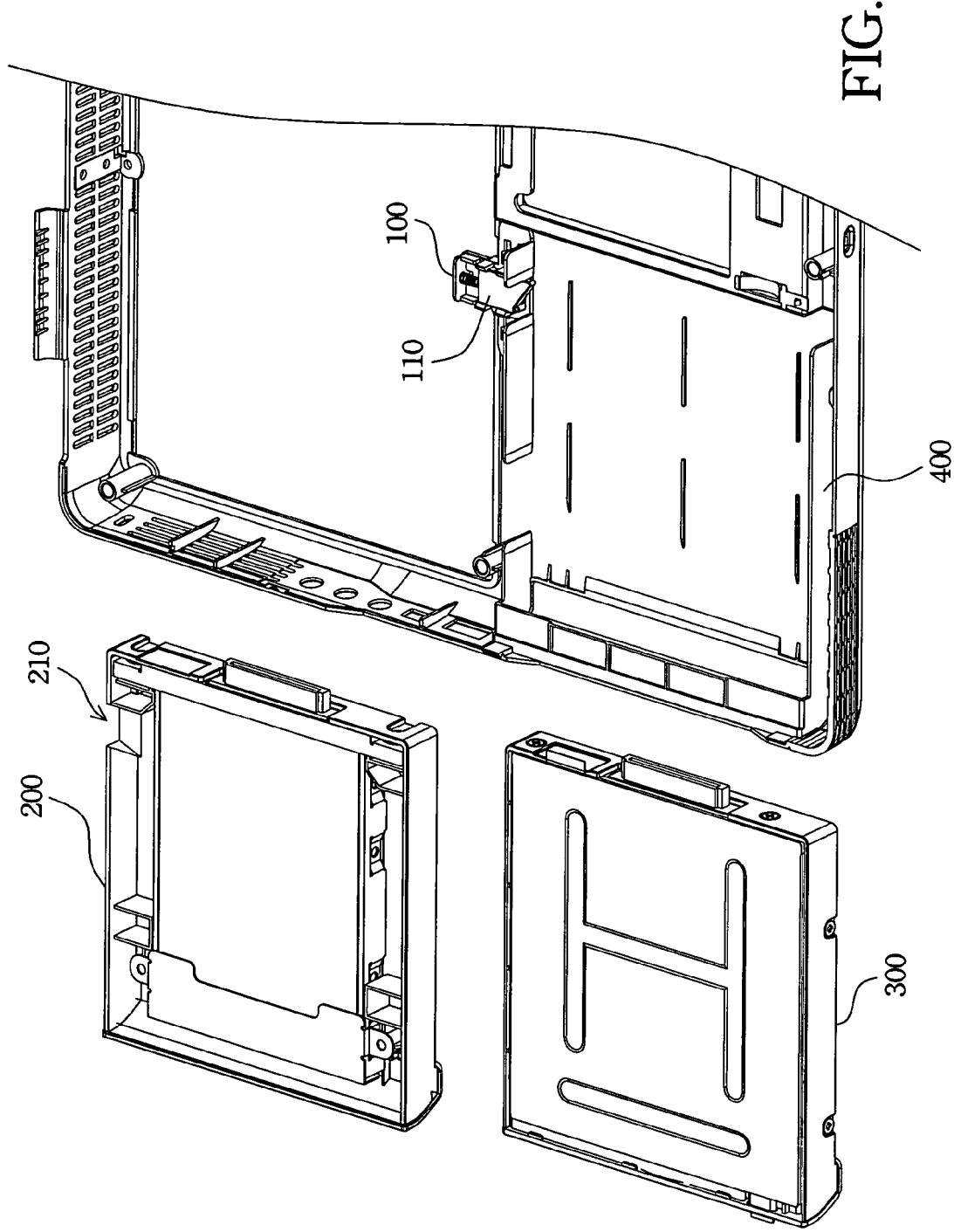
FIG. 1 is a schematic view of a preferred embodiment of a locking device according to the present invention.

FIG. 1 is a schematic view of a preferred embodiment of a locking device according to the present invention. A locking device 100 is configured in a notebook computer, and the locking device 100 utilizes a latch 110 to fix a first removable device 200 or a second removable device 300 in a fixing container 400. The first removable device 200 is a peripheral device, e.g. a removable hard disk drive, a removable floppy disk drive, a spare battery module, a card reader or an optical disk drive, for a notebook computer. The second removable device 300 is another peripheral device for a notebook computer. The card reader is a card reader for a compact flash (CF) card, a micro drive (MD) card, a secure digital (SD) card, a multi-media card (MMC), a memory stick (MS), an extreme digital (xD) card, a smart media (SM) card or the like. The optical disk drive is a CD-ROM, a DVD-ROM, a CD-RW or the like. The locking device 100 can fix various peripheral devices of the notebook computer in the fixing container 400 effectively.

When the first removable device 200 is inserted into the fixing container 400 and a fixing indentation 210 of the first removable device 200 arrives at a position of a latch 110 of the locking device 100, the latch 110 engages into the fixing indentation 210 to stably fix the first removable device 200 within the fixing container 400. When the first removable device 200 is withdrawn from the fixing container 400, the latch 110 is disengaged from the fixing indentation 210, and the first removable device 200 is then released from the fixing container 400 easily.

After the first removable device 200 is removed, the second removable device 300 can then be installed into the fixing container 400. Therefore, a notebook computer user can exchange the peripheral devices according to the working requirements at that time very easily. The locking device consequently provides a good extended capability for a notebook computer.

Figure 2:
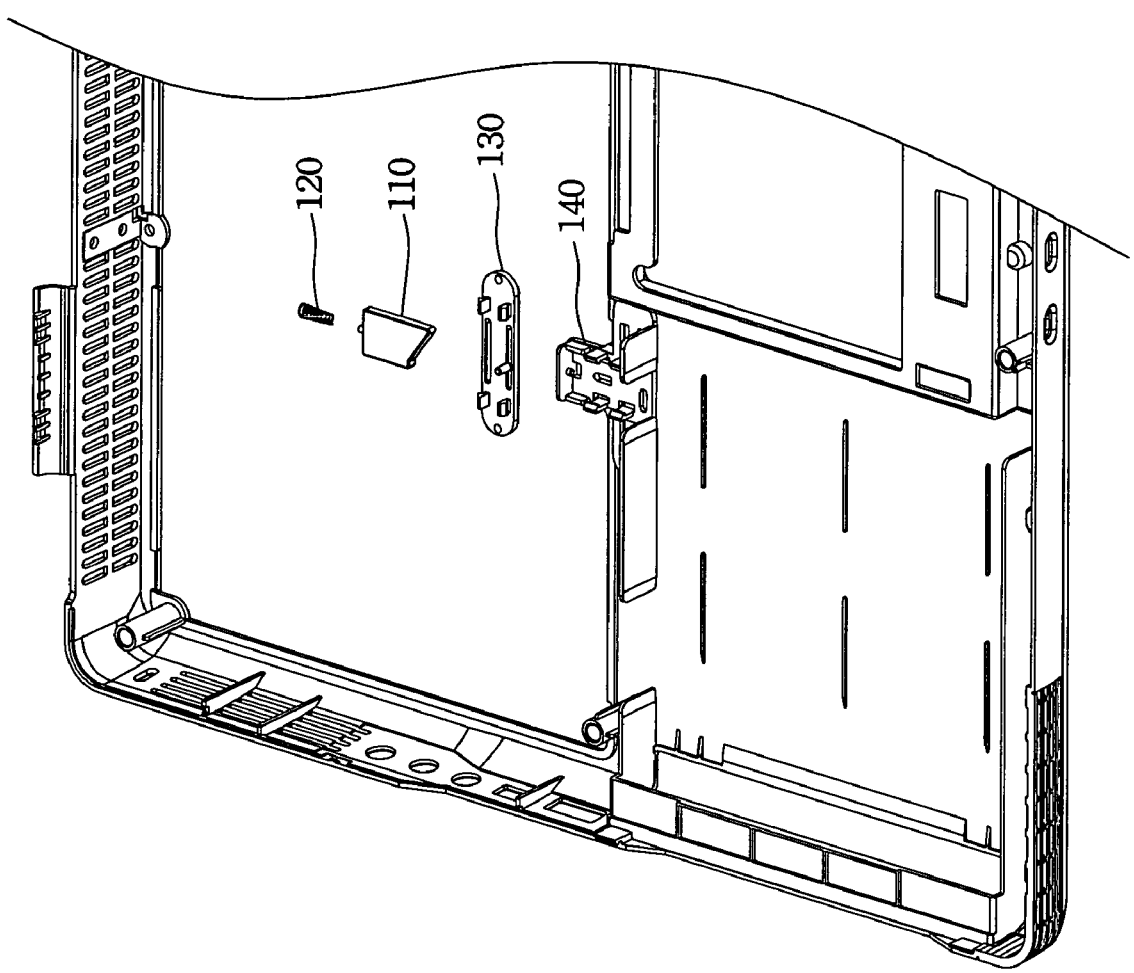
FIG. 2 is an exploded view of the preferred embodiment of FIG. 1.

FIG. 2 is an exploded view of the preferred embodiment of FIG. 1. The locking device according to the present invention includes an elastic member 120, the latch 110, a sliding switch 130 and a sliding holder 140. The elastic member 120 provides a spring force to push the latch 110 forward along a predetermined direction to lock the removable device effectively. The sliding switch 130 provides a withdrawal force to the latch 110 such that the latch 110 can be withdrawn from the fixing indentation of the removable device effectively, and the removable device can then be removed from the fixing container.

Figure 3:
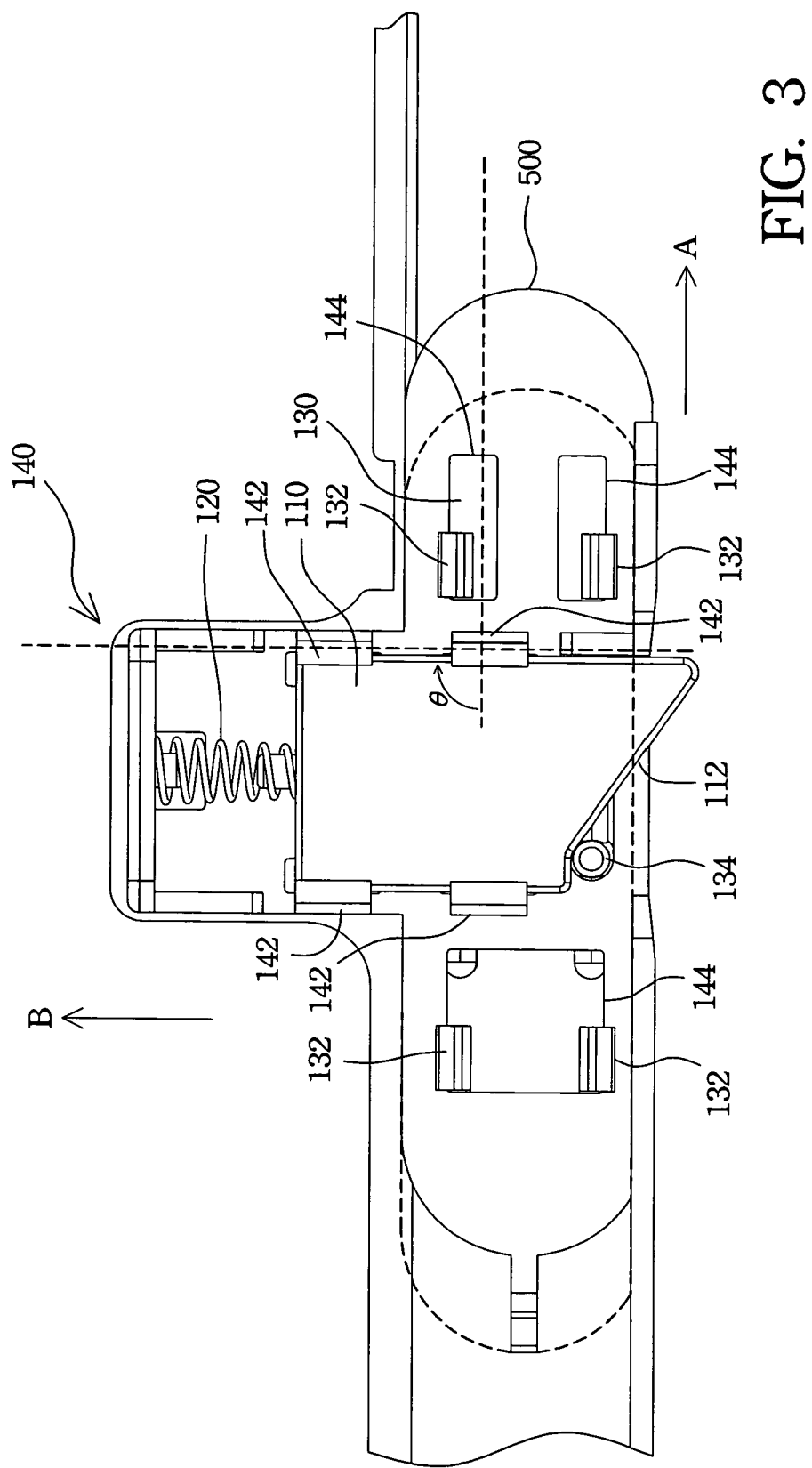
FIG. 3 is a detailed view of the locking device according to the present invention.

FIG. 3 is a detailed view of the locking device according to the present invention describing the detailed operation mechanism thereof. The latch 110 has a sliding inclined surface 112 to couple to a stud 134 on the sliding switch 130. The sliding switch 130 is configured below a base 500 of the notebook computer. Sliding clamps 132 of the sliding switch 130 are disposed upwardly and within the second sliding guiders 144 of the sliding holder 140 through the base 500. Therefore, the sliding clamp 132 can slide within the second sliding guider 144.

The sliding holder 140 further has a first sliding guider 142 that forms a predetermined included angle θ with the second sliding guider 144 on the base 500. A preferably predetermined included angle is substantially a 90° right angle. The latch 110 is disposed within the first sliding guider 142, and therefore the latch 110 can slide within the first sliding guider 142. Accordingly, the movement directions of the latch 110 and the sliding switch 130 are preferably perpendicular to each other. The elastic member 120 is attached to one end of the latch 110 to enable the latch 110 to move forward along the predetermined direction. The latch 110 can therefore effectively engage into the fixing indentation of the removable device 200 or 300 to fix the removable device 200 or 300 in the fixing container 400. The elastic member 120 also provides a recess for the latch 110 to retract so as to avoid interfering with installation and removal of the removable device.

When a removable device is installed in a notebook computer, the first step is to push the removable device 200 into the fixing container 400. The latch 110 is automatically forced backward along the predetermined direction due to being contacted by the shell of the removable device. Once the fixing indentation 210 arrives at the position of the latch 110, the spring force of the elastic member 120 pushes the latch 110 forward along the predetermined direction to insert into the fixing indentation 210, and the removable device is fixed by the latch 110 effectively.

When the removable device is withdrawn from the notebook computer, the sliding switch 130 (referring to a dashed line portion of FIG. 3, under the base 500) is moved in a direction A toward the right side of the drawing, and the stud 134 of the sliding switch 130 presses against the sliding inclined surface 112 of the latch 110. As the stud 134 is moved along the direction A toward the right side of the drawing, the sliding inclined surface 112 is forced to retract along the predetermined direction B. Therefore, the latch 110 is withdrawn from the fixing indentation 210 of the removable device, allowing the removable device to be easily withdrawn from the fixing container.

The locking device according to the present invention utilizes the sliding inclined surface 112 of the latch 110 for moving the latch 110, and there is a predetermined included angle formed between the sliding switch 130 and the latch 110 when movement, e.g. a right angle. Accordingly, the protrusion length of the locking device on the fixing container can be effectively reduced, thereby reducing the space occupied by the locking device. A conventional locking device may occupy a larger space in the notebook computer because both the movements of the latch and of the sliding switch are perpendicular to the withdrawal direction of the removable device and protrude from the fixing container.

Furthermore, because the conventional locking device may interfere with the other devices in the notebook computer, the conventional locking device makes the configuration of devices in the notebook computer more complicated.

The present latch 110 and the sliding switch 130 are perpendicular to each other when movement so that inertial forces of the latch 110 and the sliding switch 130 caused by an impact force acting upon the notebook computer are also perpendicular to each other. Therefore, the latch 110 is more difficultly disengaged from the fixing indentation and the impact force is less likely to dislodge the removable device from the fixing container as compared with the conventional locking device.

Because the inertial forces of the latch 110 and the sliding switch 130 are preferably perpendicular to each other, the inertial forces can be partly absorbed and dissipated by the first sliding guider 142 and the second sliding guider 144. Accordingly, the inertial forces do not simultaneously act upon the elastic member 120, and the locking device according to the present invention can thereby effectively and safely fix the removable device to enhance the mobility and portability of the notebook computer.

The locking device according to the present invention can effectively reduce the space occupied thereby and provides a safe and reliable fixing method for the removable device of the notebook computer. Furthermore, the locking device according to the present invention is suitable to fix and remove the removable device not only in the notebook computer but also in any apparatus having a removable device.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A locking device comprising:
   a latch comprising a sliding inclined surface and moving along a predetermined direction forward and backward;
   an elastic member coupling to the latch, the elastic member pushing the latch forward for engaging into a fixing indentation of a removable device, and the latch moving backward to compress the elastic member when the latch is pressed upon by a shell of the removable device; and
   a sliding switch coupling to the latch, a predetermined included angle formed between the latch and the sliding switch when movement, wherein the sliding switch comprises a stud and the stud contacts the sliding inclined surface, the stud pressing on the sliding inclined surface to disengage the latch from the fixing indentation of the removable device when the sliding switch is pushed to release the removable device.

2. The locking device of claim 1, wherein the locking device comprises a sliding holder and the sliding holder further comprises a first sliding guider and a second sliding guider.

3. The locking device of claim 2, wherein the latch couples to the first sliding guider.

4. The locking device of claim 2, wherein the sliding switch couples to the second sliding guider.

5. The locking device of claim 2, wherein the sliding switch further comprises a sliding clamp to clasp the second sliding guider.

6. The locking device of claim 2, wherein the predetermined included angle is about 90 degrees.

7. A removable device module with a locking device comprising:
   a fixing container;
   a removable device comprising a shell and a fixing indentation, wherein the removable device is capable of inserting into and withdrawing from the fixing container; and
   a locking device configured beside the fixing container, the locking device locking the removable device when the removable device is inserted into the fixing container, wherein the locking device further comprises:
   a latch having a sliding inclined surface and moving along a predetermined direction forward and backward;
   an elastic member coupling to the latch, wherein when the removable device inserts into the fixing container, the latch is pressed by the shell of the removable device so that the latch moves backward to compress the elastic member until the fixing indentation arrives in front of the latch and the elastic member pushes the latch forward to engage into the fixing indentation of the removable device to fix the removable device within the fixing container; and
   a sliding switch coupling to the latch, a predetermined included angle formed between the latch and the sliding switch when movement, wherein the sliding switch comprises a stud and the stud glidingly couples to the sliding inclined surface and presses on the sliding inclined surface to retract the latch from the fixing indentation of the removable device when the sliding switch is pushed to release the removable device.

8. The removable device module of claim 7, wherein the locking device comprises a sliding holder and the sliding holder further comprises a first sliding guider and a second sliding guider.

9. The removable device module of claim 8, wherein the latch couples to the first sliding guider.

10. The removable device module of claim 8, wherein the sliding switch couples to the second sliding guider.

11. The removable device module of claim 10, wherein the sliding switch further comprises a sliding clamp to clasp the second sliding guider.

12. The removable device module of claim 7, wherein the predetermined included angle is about 90 degrees.

13. A notebook computer having a removable device module with a locking device comprising:
   a removable device module fixing container installed in the notebook computer;
   a removable device comprising a shell and a fixing indentation, wherein the removable device is capable of inserting into and withdrawing from the removable device module fixing container; and
   a locking device configured beside the removable device module fixing container, the locking device locking the removable device when the removable device is inserted into the removable device module fixing container, wherein the locking device further comprises:
   a latch having a sliding inclined surface and moving along a predetermined direction forward and backward;

an elastic member coupling to the latch, wherein when the removable device inserts into the removable device module fixing container, the latch is pressed upon by the shell of the removable device so that the latch moves backward to compress the elastic member until the fixing indentation arrives in front of the latch and the elastic member pushes the latch forward to engage into the fixing indentation of the removable device to fix the removable device within the removable device module fixing container; and a sliding switch coupling to the latch, an included angle formed between the latch and the sliding switch when movement, wherein the sliding switch comprises a stud and the stud glidingly couples to the sliding inclined surface and presses on the sliding inclined surface to retract the latch from the fixing indentation of the removable device when the sliding switch is pushed to release the removable device.

14. The notebook computer of claim 13, wherein the notebook computer further comprises a sliding holder and the sliding holder comprises a first sliding guider and a second sliding guider, wherein the latch couples to the first sliding guider and the sliding switch couples to the second sliding guider.

15. The notebook computer of claim 14, wherein the sliding switch further comprises a sliding clamp to clasp the second sliding guider.

16. The notebook computer of claim 13, wherein inertial forces of the latch and the sliding switch caused by a shock force are dispelled by the included angle in order to keep the latch from disengaging from the fixing indentation.

17. The notebook computer of claim 13, wherein the removable device comprises a peripheral device of the notebook computer.

18. The notebook computer of claim 17, wherein the peripheral device of the notebook computer comprises a floppy disk drive.

19. The notebook computer of claim 17, wherein the peripheral device of the notebook computer comprises a hard disk.

20. The notebook computer of claim 17, wherein the peripheral device of the notebook computer comprises a card reader.

* * * * *